(12) United States Patent
Hard (10) Patent No.: US 8,485,501 B1
(45) Date of Patent: Jul. 16, 2013

(54) WIRELESS CONTROLLED APPARATUS FOR PULLING WIRE THROUGH CONDUIT

(76) Inventor: William E Hard, Alexander, AR (US)

( * ) Notice: Subject to any disclaimer, the term of this patent is extended or adjusted under 35 U.S.C. 154(b) by 815 days.

(21) Appl. No.: 12/470,732

(22) Filed: May 22, 2009

(51) Int. Cl.
| | |
|---|---|
| *B66F 3/00* | (2006.01) |
| *H02G 1/06* | (2006.01) |
| *B66D 1/14* | (2006.01) |
| *A01K 89/00* | (2006.01) |
| *A01K 89/015* | (2006.01) |
| *H02G 1/08* | (2006.01) |

(52) U.S. Cl.
USPC ............ 254/134; 254/134.3 FT; 254/347; 242/223

(58) Field of Classification Search
USPC . 254/134, 134.3 FT, 347, 394, 286; 242/223, 242/390.2
See application file for complete search history.

(56) References Cited

U.S. PATENT DOCUMENTS

| | | | | | |
|---|---|---|---|---|---|
| 3,610,582 | A | * | 10/1971 | Passoni | 254/134.3 FT |
| 4,014,516 | A | * | 3/1977 | Jacks | 254/134.5 |
| 4,456,225 | A | * | 6/1984 | Lucas | 254/134.3 FT |
| 4,497,470 | A | * | 2/1985 | Carter et al. | 254/134.3 FT |
| 4,917,362 | A | * | 4/1990 | Wilson | 254/134.3 FT |
| 5,389,920 | A | * | 2/1995 | DeLand et al. | 340/12.5 |
| 5,440,297 | A | * | 8/1995 | Bright | 340/686.4 |
| 5,966,789 | A | * | 10/1999 | Dickson et al. | 29/235 |
| 6,254,026 | B1 | * | 7/2001 | Tsai | 242/390.2 |
| 6,367,778 | B1 | * | 4/2002 | Mobley et al. | 254/134.3 R |
| 7,025,333 | B1 | * | 4/2006 | Gianturco | 254/134.3 FT |
| 7,150,448 | B1 | * | 12/2006 | Swift | 254/134.3 FT |
| 7,158,377 | B2 | * | 1/2007 | Mecca et al. | 361/679.23 |
| 7,260,431 | B2 | * | 8/2007 | Libbus et al. | 607/4 |
| 7,319,380 | B2 | * | 1/2008 | Schulze et al. | 340/447 |
| 7,504,992 | B2 | * | 3/2009 | Pilcher et al. | 342/125 |
| 7,543,798 | B2 | * | 6/2009 | Cunningham | 254/266 |
| 7,712,726 | B1 | * | 5/2010 | Jernigan | 254/134.3 FT |
| 7,832,709 | B2 | * | 11/2010 | O'Connor | 254/134.3 R |
| 8,033,678 | B2 | * | 10/2011 | Patterson | 362/120 |
| 8,063,636 | B2 | * | 11/2011 | Hyde et al. | 324/309 |
| 8,152,589 | B2 | * | 4/2012 | Bowen et al. | 446/454 |
| 8,272,892 | B2 | * | 9/2012 | McNeely et al. | 439/577 |

* cited by examiner

*Primary Examiner* — Lee D Wilson
*Assistant Examiner* — Alvin Grant
(74) *Attorney, Agent, or Firm* — Joe D. Calhoun; Nashaua A. Normet (57) ABSTRACT

A wirelessly controlled apparatus for pulling a free end of wire into the mouth of a conduit and out of the destination end of the conduit. The apparatus includes a wireless spooling controller having an RF transceiver in cooperating communication with a spooling machine having an RF transceiver, for transmitting signaling activating or deactivating the motor-drive of the spooling machine, and for receiving wire-pull completion signaling from the spooling machine. The spooling machine includes a chock pivot-mounted at a mounted end to a frame anchoring the spooling machine near the destination end of the conduit, the chock engageable with a motor-driven gear-wheel engageable with a cogged spool-wheel driven by the motor-drive. Pivotal movement of the chock to the gear-wheel facilitates the fulcrumatic disengagement of the gear-wheel from the spool-wheel cogs, to ready the spooling machine in a starting configuration; activation of the motor-driven gear-wheel essentially causes unchocking of the gear-wheel. The spooling machine also includes an extension spring having one end affixed to the motor-drive proximal to the gear-wheel, and another end affixed to the anchoring frame, spring biasing the unchocked gear-wheel into engagement with the spool-wheel cogs.

18 Claims, 11 Drawing Sheets

WIRELESS CONTROLLED APPARATUS FOR PULLING WIRE THROUGH CONDUIT

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

This invention generally relates to devices for pulling wire through conduit, such as conduit used by electrical contractors wiring a structure. More particularly, this invention relates to such a wire pulling device that is remotely controllable, preferably having wireless control.

(2) Description of Related Art including Information Disclosed 37 CFR 1.97 and 1.98.

Supplying buildings with electricity and communications capabilities involves threading wiring (lines or cabling) through conduit. Typically, the path that cable must travel through the conduit includes changes in elevation and turns around corners. Generally, the procedure used to run cable or "pull wire" involves first threading string or lightweight flattened "fish tape" through the entire length of conduit. The heavier pull-line is then attached to one end, and extended through the conduit by pulling the string or fish tape out of the conduit. Cabling is then attached to one end of the pull-line extending through the conduit, and pulled through the conduit as the pull-line is pulled out of the conduit.

The pulling force required can be significant depending on the weight of the cable and the distance traveled. The pulling force can also increase with the bends and turns in the conduit. Thus, there is a need to substitute machine force for human force to reduce the human strength and effort required in this procedure. Wire pulling devices have been available for a number of years.

At present, it requires two people to pull wire through the conduit intended to house the wire; after a pull-line has been run through the conduit (typically from the destination end to the end into which the wire will be introduced), and temporarily coupled to the wire, one person is needed to feed the wire into the conduit, and one person is needed to manually pull the pull-line back through the conduit to the destination end. The obvious benefit of the present invention is that the labor time is essentially cut in half by using just one person to accomplish both tasks. Often the wire will become tangled on its spool, making it necessary to stop pulling the pull-line until the wire can be untangled; alternatively, sometimes the wire encounters an angle or other obstruction preventing passage without further intervention (such as reducing the diameter of the coupling of the wire and the pull-line). When such stoppage occurs, often the two electricians or other workers are not within sight or earshot of each other, or cannot otherwise communicate readily with each other. The person feeding the wire customarily has to yank back on the wire to signal the other to stop pulling the pull-line. The worker pulling the pull-line typically has to leave the destination end and go find out why the pulling is stopped, and then return back to start pulling again after the cause of the stoppage has been cured. The valuable time of two workers is therefore squandered. Accordingly, there is a need for a wire pulling machine that is remotely controllable, preferably having wireless control.

Known in the art are the following patents, arguably related to the patentability of the present invention:

| U.S. Pat. Nos. | 1ˢᵗ Inventor | Date of patent/Publication |
|---|---|---|
| 2,755,066 | Mallasch | 17 Jul. 1956 |
| 4,270,734 | Straight | 2 Jun. 1981 |
| 4,337,024 | Gebo | 6 Jul. 1982 |
| 4,497,470 | Carter | 5 Feb. 1985 |
| 4,917,362 | Wilson | 17 Apr. 1990 |
| 5,464,193 | Wrate | 7 Nov. 1995 |
| 6,293,520 | Turner | 25 Sep. 2001 |
| 6,682,050 | Ray | 27 Jan. 2004 |
| 6,691,985 | El Haddad | 17 Feb. 2004 |

U.S. Pat. No. 6,293,520 issued to Turner discloses a tram-like device for pulling an attached second overhead cable alongside a first overhead cable. The device includes a motorized body having a drive wheel that turns against the first cable to propel the cable puller along the first cable, dragging the attached second cable along. The cable puller also includes a receiver for receiving radio signaling from a transmitter held by the user, to control the movement of the cable puller to and from its destination point.

U.S. Pat. No. 4,917,362 issued to Wilson discloses an automatic wire puller for use with a standard tape reel having a play-out and take-up handle, the automatic wire puller including a bi-directional drive for selectively rotating the tape reel in a play-out (tape lengthening) or take-up (tape shortening) direction, and a wired means for remotely selecting the direction of operation and engaging the drive means. This patent also discloses a means for sensing torque on the tape reel, and disabling the drive means if the tape becomes snagged during take-up or if tape take-up is complete.

U.S. Pat. No. 4,270,734 issued to Straight discloses a winch powered by an electrical motor having an actuation button on the motor. After the winchline is threaded through the conduit and attached, to the wire to be pulled through the conduit, the winch button actuates the motor to rotate the winch drum; spooling of the winchline around the drum pulls the wire through the conduit and up to the drum, at which time the operator deactivates the motor.

U.S. Pat. No. 6,691,985 issued to El Haddad discloses a motor-driven shaft having wire (or a tether for wire) attached; rotation of the shaft essentially winds the wire (or tether) around the shaft, thereby pulling the wire into an electrical box. An actuator such as a foot operated pedal selectively turns the motor on and off.

None of the above listed patents discloses an apparatus for pulling a free end of wire into the mouth of a conduit and through the destination end of the conduit, including a wireless spooling controller in cooperating communication with a spooling machine and anchoring means for anchoring said spooling machine near the destination end of the conduit.

BRIEF SUMMARY OF THE INVENTION

This machine, designed to install electrical wire and cable in conduit, very generally includes (comprises) a wirelessly controlled apparatus for pulling a free end of wire into the mouth of a conduit and out of the destination end of the conduit. The apparatus includes a wireless spooling controller having an RF transceiver in cooperating communication with a spooling machine having an RF transceiver, for transmitting signaling activating or deactivating the motor-drive of the spooling machine, and for receiving wire-pull completion signaling from the spooling machine. The spooling machine includes a chock pivot-mounted at a mounted end to a frame anchoring the spooling machine near the destination end of the conduit, the chock engageable with a motor-driven gear-wheel engageable with a cogged spool-wheel driven by the motor-drive. Pivotal movement of the chock to the gear-wheel facilitates the fulcrumatic disengagement of the gear-wheel from the spool-wheel cogs, to ready the spooling machine in a starting configuration; activation of the motor-driven gear-wheel essentially causes unchocking of the gear-wheel. The spooling machine also includes an extension spring having one end affixed to the motor-drive proximal to the gear-wheel, and another end affixed to the anchoring frame, spring biasing the unchocked gear-wheel into engagement with the spool-wheel cogs.

One primary object of the present invention is to provide a wire puller that will allow one person to expeditiously pull wire through conduit in the field.

Another primary object of the invention is to provide a wire pulling machine that is remotely controllable, preferably wirelessly controlling the activation of the machine to start pulling the pull-line through the conduit, and controlling deactivation of the machine when the wire pull has been completed or when the wire pull has been interrupted by a snag or other impediment.

Another primary object of the present invention is to provide a wire pulling machine that is portable and easy to operate.

Other objects will be apparent from a reading of the written description disclosed herein, together with the claims.

FIGS. 1 through 13 illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply:

The phrase "destination end" essentially means an end of conduit opposite from the end denominated as the "mouth"; it may be either end of the conduit, not dependent upon whether the end is nearest to any power source or fuse box.

The phrase "motor-driven gear-wheel" essentially means any arrangement whereby a motor directly or indirectly (through mechanical linkage) causes the turning of a wheel having gear teeth or cogs.

The phrase "cogged spool-wheel" essentially means any arrangement whereby a member (typically cylindrical in shape) is adapted with circumferential cogs or teeth essentially meshing or cooperating with the gear teeth of a gear-wheel, and adapted to accept the winding of a pull-line around the member.

The phrase "hinge mounting" essentially means any arrangement whereby one end of an element is attached to a second element in such a manner as to allow the angle between the first element and the second element to change while the attached end remains attached to the second element; such attachment means are not limited to hinge-pin arrangements of the type commonly found in doorways.

The phrase "pivot mounting" essentially means any arrangement whereby one end of an element is attached to a second element in such a manner as to allow the angle between the first element and the second element to change while the attached end remains attached to the second element; such attachment is not necessarily a rotationally pivoting arrangement.

Also for the sake of simplicity, the conjunctive "and" may also be taken to include the disjunctive "or," and vice versa, whenever necessary to give the claims herein the broadest interpretation and construction possible. Likewise, when the plural form is used, it may be taken to include the singular form, and vice versa.

The invention disclosed herein is not limited by construction materials to the extent that such materials satisfy the structural and/or functional requirements of any claim. For example, although plate material essentially includes steel, it may include any material capable of providing the necessary structural rigidity and fulcrumatic and/or leveraging support. Such materials may include (for example) metals and alloys, polymers and plastics, and mixtures and combinations thereof.

The machine will be especially helpful in the field when the electrician is on a project alone and needs to pull wire. It will also be appreciated by the contractor that has several electricians on the project; the machine will free up labor to do other tasks, by allowing one electrician to pull wire alone, cutting the labor time in half and therefore saving the contractor a significant amount of expense on each project. The machine will make the process of pulling wire much faster and save at least 50% of the labor time currently required. It can be used to pull from junction boxes, wireways and fittings, and can be adapted to pull straight from conduit without a box or fitting.

The most general embodiment of the wireless-controlled wire pulling system includes (comprises) an apparatus for pulling a free end of wire into the mouth of a conduit and out the destination end of the conduit, said apparatus comprising a wireless spooling controller in cooperating communication with a spooling machine having an anchoring means for anchoring said spooling machine near the destination end of the conduit. More particularly, said spooling machine includes a motor-driven gear-wheel engageable with a cogged spool-wheel impaled on an axis. The motor should ideally ramp up from stop to full speed relatively quickly, and with sufficient torque. One suitable motor is a Groschopp Model PM 8014-RA2515M, although other satisfactory motors are available. Moreover, for one version of the spooling machine, ideally the motor should be capable of accepting DC voltage from rechargeable batteries mounted to the anchoring frame (or cart for carrying the apparatus and any necessary battery charger, not shown).

Ideally the wireless spooling controller will include a programmable logic controller, or similar means of controlling the transmission of wireless signaling and the response to receipt of same. The controller signaling may be selected from the group consisting of transmitters of RF signals, optical links, ultrasonic links, sonar, or other means of wireless communication, in cooperating communication with a spooling machine wireless receiver cooperatively compatible with said selected controller transmitter. Each of said technologies has a common characteristic justifying its inclusion in this group, namely, the ability to facilitate activation and deactivation of the wire pulling system without direct physical connection such as mechanical linkage or electrical wiring. More particularly, the wireless wire-pulling controller includes an RF transmitter for signaling activating or deactivating said spooling machine; the spooling machine includes an RF receiver for receiving said signaling activating or deactivating said spooling machine.

Ideally, the controller will be capable of mounting to a ladder, so that the user will not be required to hold onto the controller the entire time it is in use. The controller ideally should also be capable of being operated with the switch(es) activated by a foot, hand or knee. A footswitch should be capable of being attached to a ladder rung with a hook and loop fastener strap such as Velcro; it may also need to be able to be strapped to the inside of the user's leg or knee, to be activated by pressure from the opposite leg or knee. This will free up both hands for feeding wire or cable into mouth of the conduit. Such controllers are known in the field.

The spooling machine further includes a disengagement means for disengaging said gear-wheel from said cogged spool-wheel. More particularly, the disengagement means includes the hinge mounting (to the anchoring means) of a hinged-end of said motor-drive, distal from said gear-wheel. This allows the motor-driven gear-wheel to be temporarily separated from the cogged spool-wheel when motor linkage is not desired. The spooling machine further includes a chock pivot-mounted at a mounted end to the frame of said anchoring means, the chock engageable with said gear-wheel; the pivotal movement of said chock to said gear-wheel facilitates the fulcrumatic disengagement (and continued disengagement) of said gear-wheel from said spool-wheel cogs. The spooling machine further includes an extension spring having one end affixed to said motor-drive proximal to said gear-wheel, and another end affixed to said anchoring means frame and spring biasing said gear-wheel into engagement with said spool-wheel cogs. The spooling machine may further include a lever handle facilitating unbiasing of said gear-wheel and chocking of said gear-wheel out of engagement with said spool-wheel cogs.

Wireless signaling activates the motor-drive to activate rotation of the gear-wheel, thereby un-chocking the gear-wheel, and engagement of the gear-wheel with the spool-wheel cogs. Such signaling is preferable radio frequency (RF) signaling.

The spooling machine further includes a pull-line having one end attached to said spool-wheel, the free end being threadable through the conduit and joinable to the end of the wire to be pulled into the mouth of the conduit and out of the destination end of the conduit.

The anchoring means may include at least one clamp (and preferably two clamps) having a cooperating pair of concave shoes adjustable for clamping a conduit and thereby anchoring said apparatus near the destination end of the conduit. One prototype of the anchoring means includes at least one vise-grip clamp, essentially a hand actuated set of lockable pincer C-clamps, modified so that actuation will allow firm lock-gripping of a conduit without applying an excessive amount of force to the conduit to deform it in such a way as to weaken its structural strength or impede the movement of wiring within its elongate cavity. Standard vise-grip C-clamps (known in the field) include handles similar to those of pliers, actuating the opening and closing of two half-Cs in which the tips (the opposite ends of the C) come together to clamp the desired item; known vise-grips also have a bolt extending into the end of one handle, allowing adjustment of the amount of spread (or separation) of the clamping tips when the handles are completely squeezed together. Known locking vise-grips also lock when completely squeezed together; they have a lever on the inner surface of the other handle, allowing the grips to be unlocked from their fully closed position. The present invention modifies the known locking vise-grip C-clamps, by removing each clamping section of the two half-Cs, and replacing each with a concave shoe having its concave surface positioned to interface along the longitudinal axis of a portion of conduit. In this manner, each conduit gripping assembly may be adjusted to straddle essentially opposite sides of the conduit, and grip the conduit without applying force that could damage the conduit or scar its surface; and each conduit gripping assembly is capable of gripping pipes having different diameters.

Alternatively, the anchoring means may include at least one ratcheting strap known in the field. Although such a strap may possibly be affixed at a middle portion to the anchoring means frame, affixation is not necessary so long as the strap encircles both the conduit and a sufficient portion of the apparatus to bind the two firmly together. Typically the strap has ends essentially circumnavigating the conduit (and the anchoring means frame), before the free end of the strap enters the ratcheting end and is ratcheted tighter. Preferably, in this version of the invention, the anchoring frame will include a conduit-support buttress or stop, to prevent deformation (or crushing) of the conduit by tight anchoring near the destination end of the conduit.

The anchoring means frame may further include at least one centering roller for centering the pull-line between the destination end of the conduit and the spool-wheel. The anchoring means may further include an idler bracket facilitating stable positioning of said centering roller near a conduit box at the destination end of the conduit; it may also carry an idler roller facilitating travel of the pull-line between the destination end of the conduit and the spool-wheel. Moreover, the anchoring means may further include an adjustment means (125) for adjusting the positioning of said spooling machine near the destination end of the conduit; for example, the idler bracket may be mounted on one or (preferably) two parallel threaded rods allowing adjustment of the idler roller so that the pull-line is optimally positioned and guided when it travels out of the destination end of the conduit, over the idler roller, and onto the spool-wheel. Alternatively, the idler bracket may be mounted on one or (preferably) two essentially parallel rods (not shown) having holes or stops aligned periodically along the rods; the idler bracket (or other associated element of the spooling machine or anchoring frame) would include pins insertable within the holes, or indents essentially capturing the stops, to all adjustment of the positioning of the spooling machine. Such adjustment may assist in preventing the spooling pull-line from pulling the roller into contact with the destination end of the conduit (or any conduit box), to prevent hindering of spooling.

The spooling machine further includes a wire-pull completion sensor switch means for deactivating said motor drive when the free end of the wire has been pulled completely out of the destination end of the conduit. It also may include a spooling machine RF transmitter transmitting wire-pull completion signaling; said wireless spooling controller may further include a controller RF receiver for receiving said wire-pull completion signaling, and indicator means for indicating said receipt of said wire-pull completion signaling. The wire-pull completion sensor switch means may include a proximity sensor switch (105) near the destination end of the conduit, for sensing the proximity of wire to deactivate said motor-drive. Alternatively, the completion sensor switch means may include a limit sensor switch (not shown) near the destination end of the conduit and through which the pull-line travels, sensing the increase in diameter as the wire is pulled through said limit sensor to deactivate said motor-drive; these are known in the field.

The spooling machine may be bi-directional and include the switch(es) necessary for reversing the motorized spooling sufficient to relieve any tension on the pull-line or wire caused by snagging of same in the conduit, thereby allowing the user to pull the wire back toward the mouth of the conduit and reactivate the spooling; such sensors are known to be within the motor linkage/electronics or its housing (108). Alternatively, the spooling machine may include a wire-pull interruption sensor switch means for deactivating said motor-drive when said free end of said pull-line has become snagged within the conduit. The spooling machine RF transmitter may also transmit wire-pull interruption signaling; said controller RF receiver may also receive said wire-pull interruption signaling, with said indicator means indicating said receipt of said wire-pull interruption signaling. More particularly, the interruption sensor switch means may include a spooling resistance sensor such as a thermal overload sensor switch sensing excessive heat generation and/or amperage associated with said motor-drive; such sensors are known to be within the motor linkage/electronics or its housing. Alternatively, the spooling machine may include a slip clutch instead of a thermal overload switch, to keep the motor-drive gear-wheel from overpowering the pull-line, or otherwise stopping pulling in an overload situation.

The system may also include adaptors for anchoring the spooling machine to different types of wireways. For example, the system may have a large sleeve adaptor that fits over the top of a vertical conduit, such as for a light pole.

Figure 1:
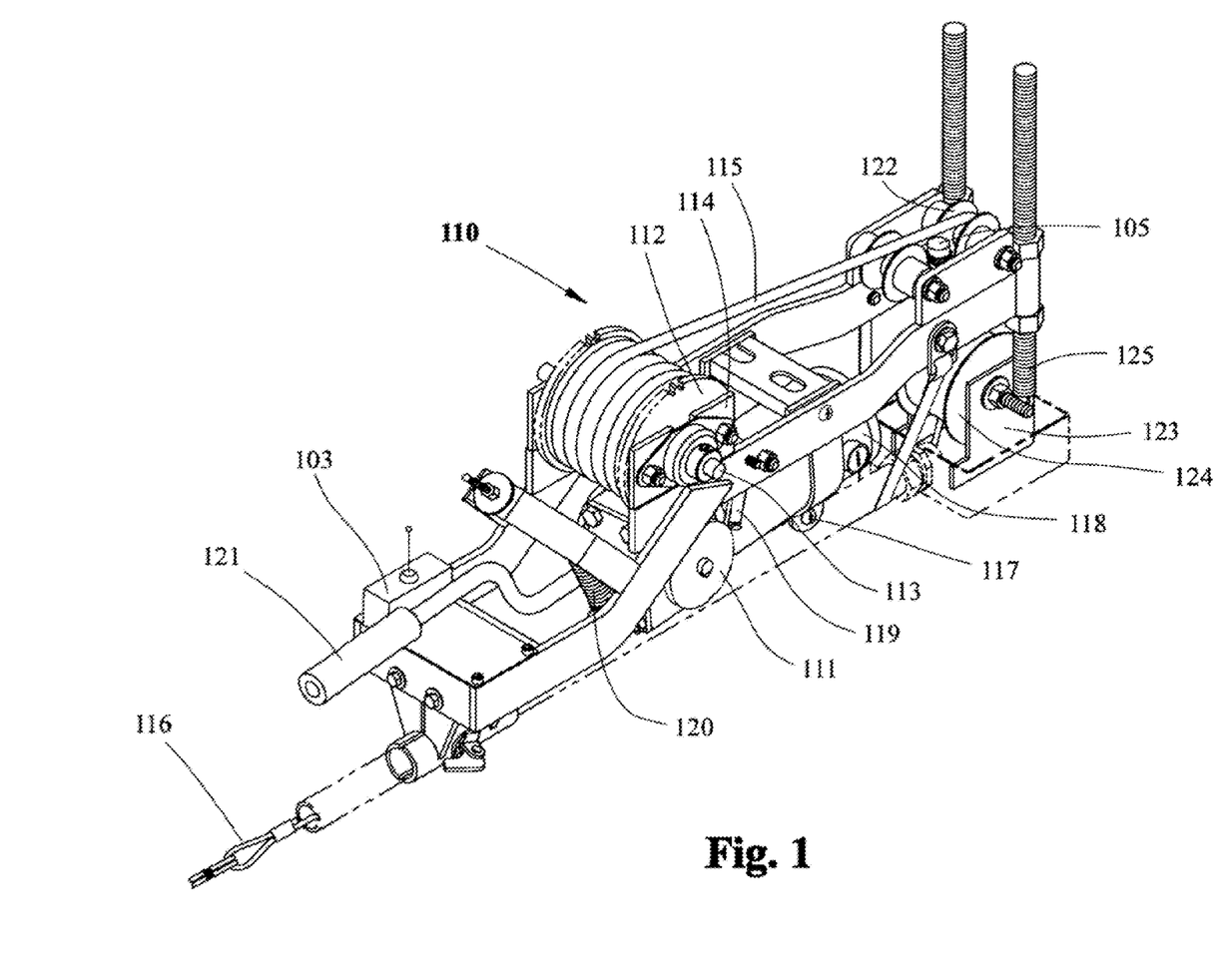
FIG. 1 depicts a perspective view of the invention, with the motor-driven gear-wheel engaged with the cogged spool-wheel.
Figure 2:
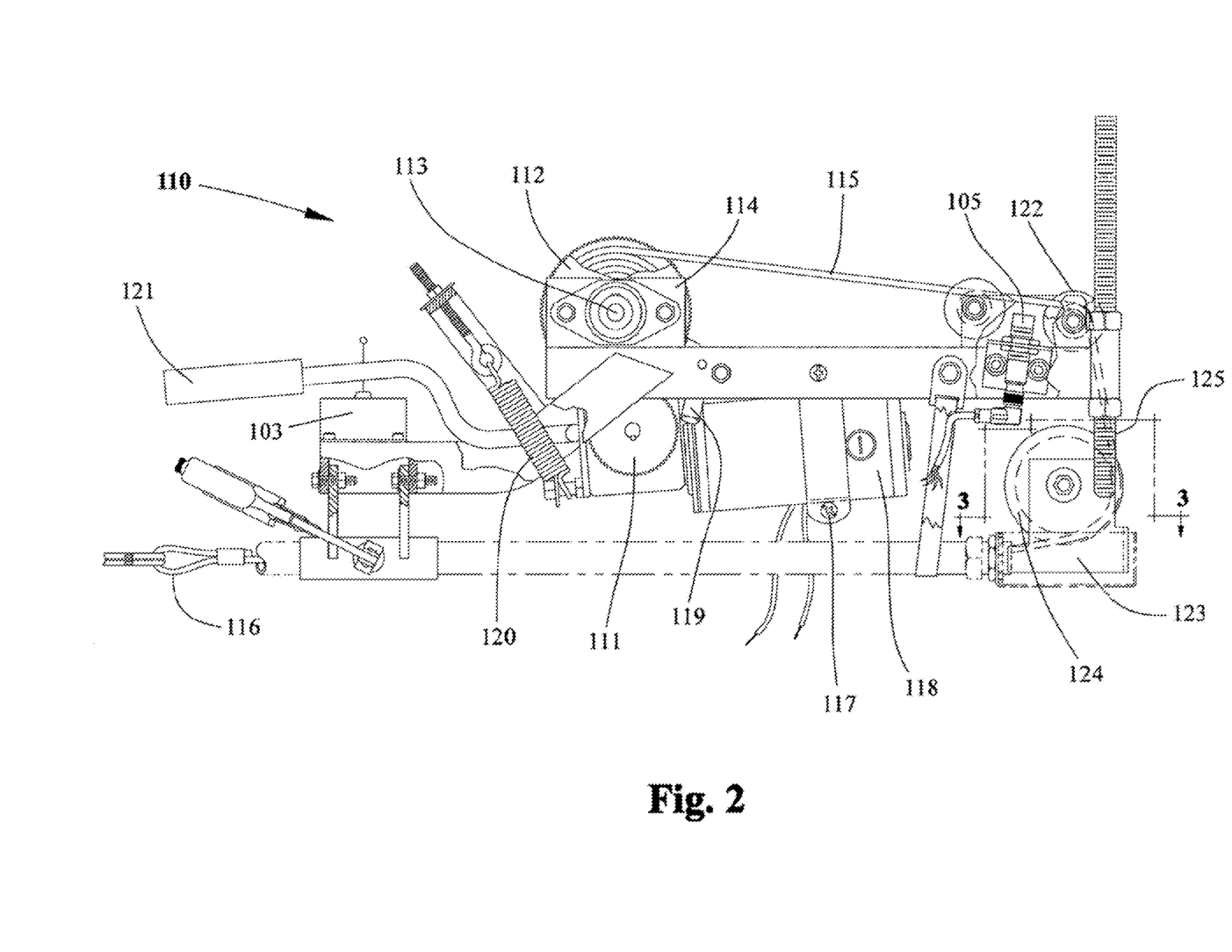
FIG. 2 depicts an elevation view of the right side of the invention of FIG. 1.
Figure 3:
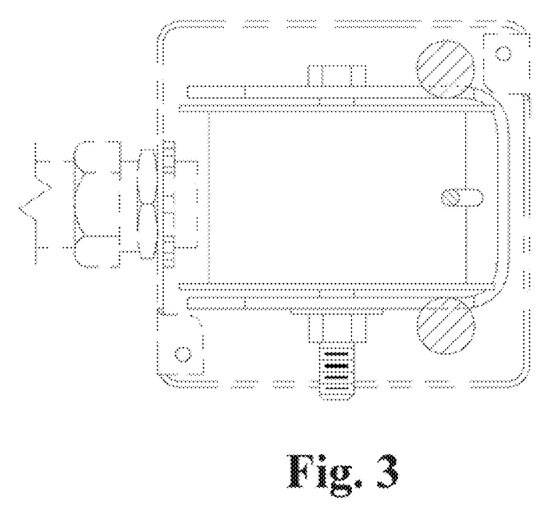
FIG. 3 depicts a longitudinal cross section of the portion of the invention marked as 3-3 in FIG. 2.
Figure 4:
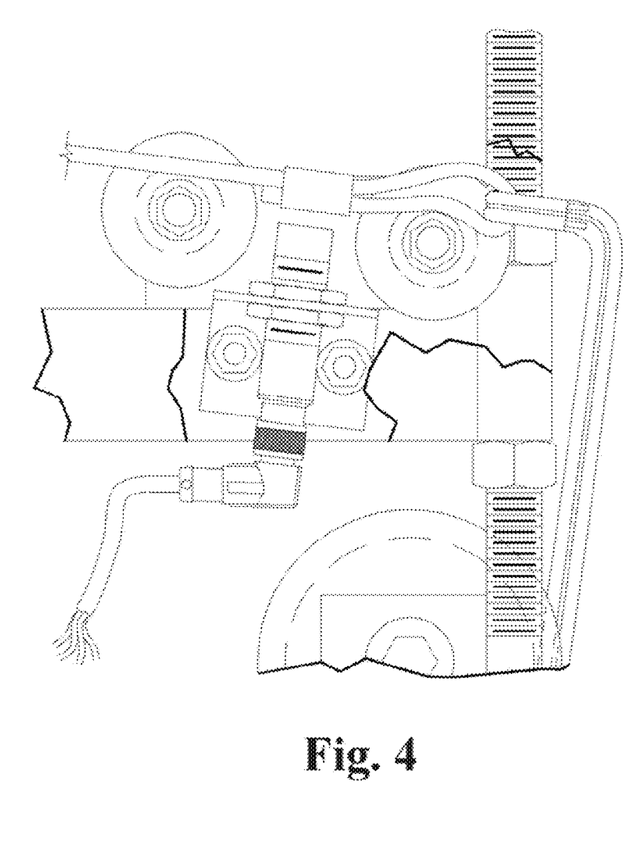
FIG. 4 depicts a longitudinal cross section of the portion of the invention encircled in FIG. 6 along the plane marked as 4-4 in FIG. 6, after the pull-line juncture with the wire has been pulled over the centering roller.
Figure 5:
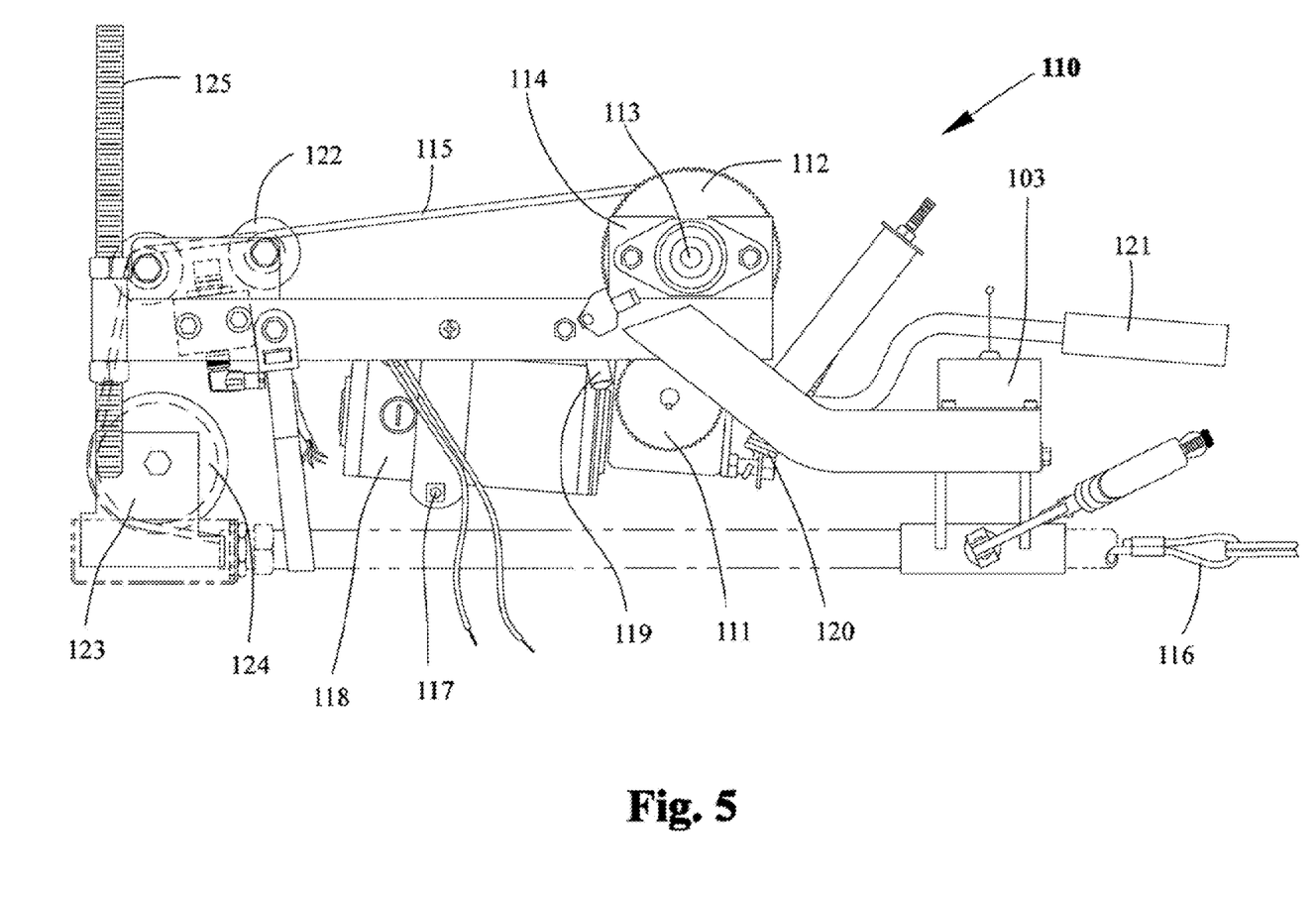
FIG. 5 depicts an elevation view of the left side of the invention of FIG. 1.
Figure 6:
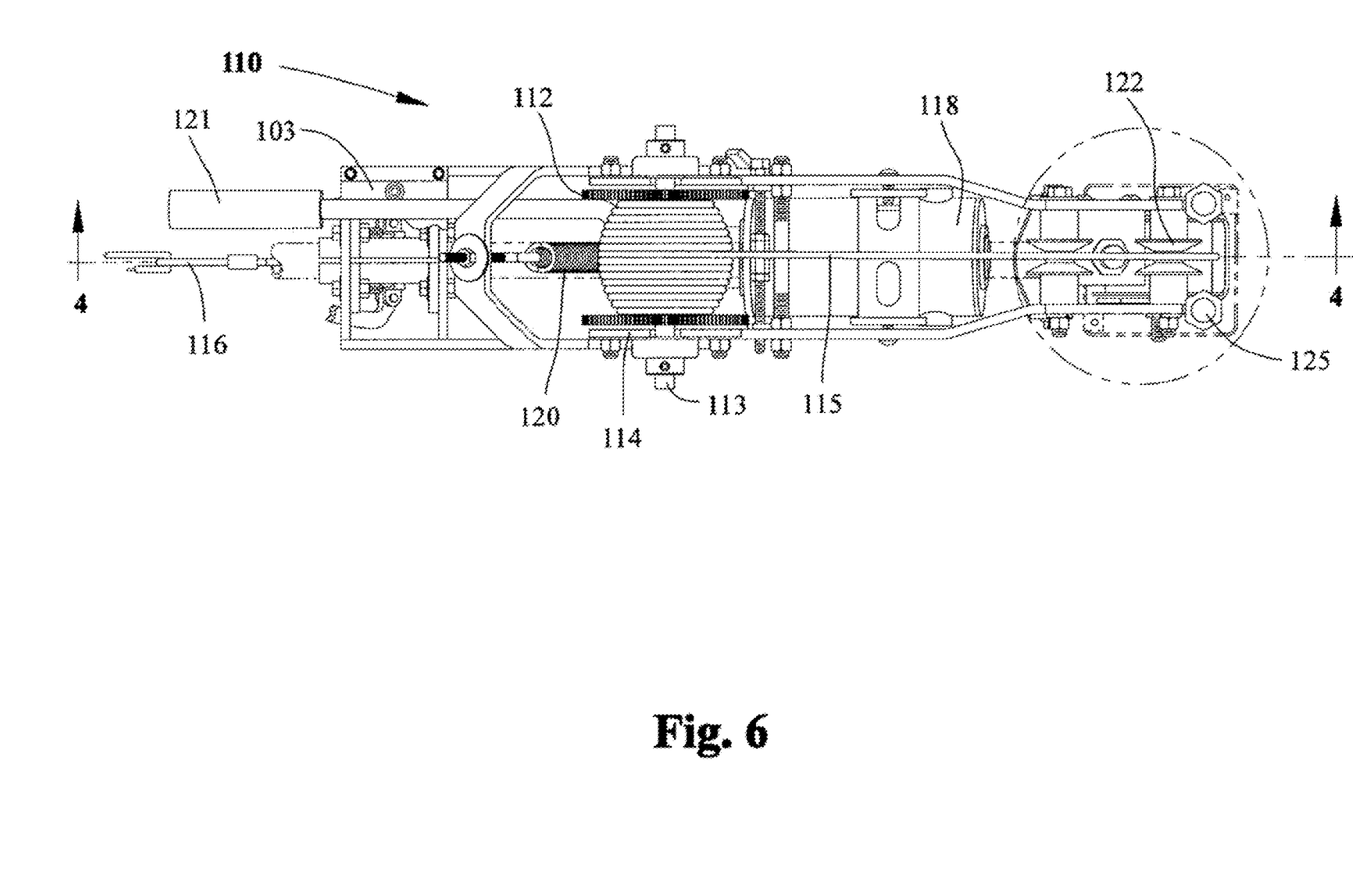
FIG. 6 depicts a top plan view of the invention of FIG. 1.
Figure 7:
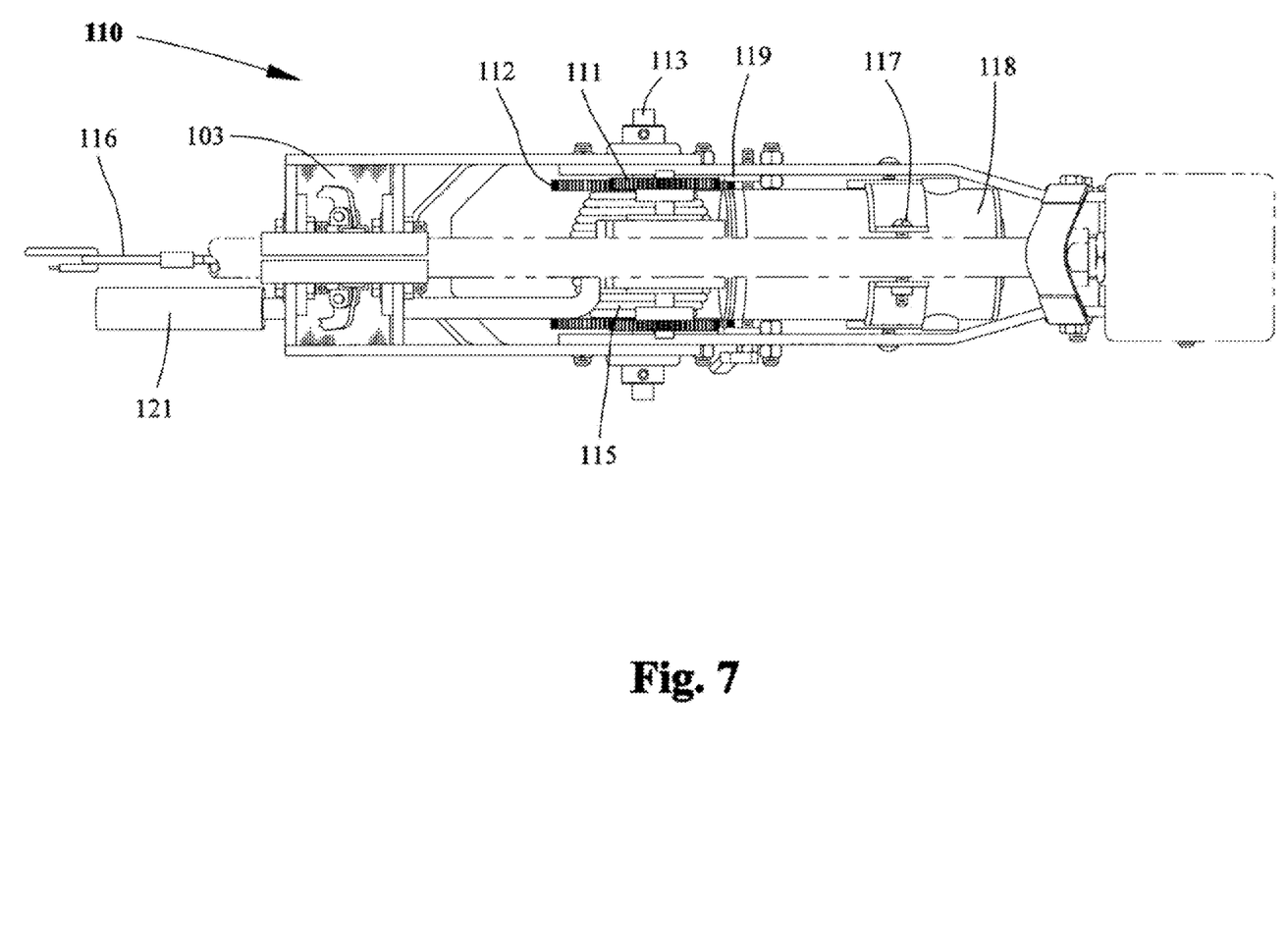
FIG. 7 depicts a bottom plan view of the invention of FIG. 1.
Figure 8:
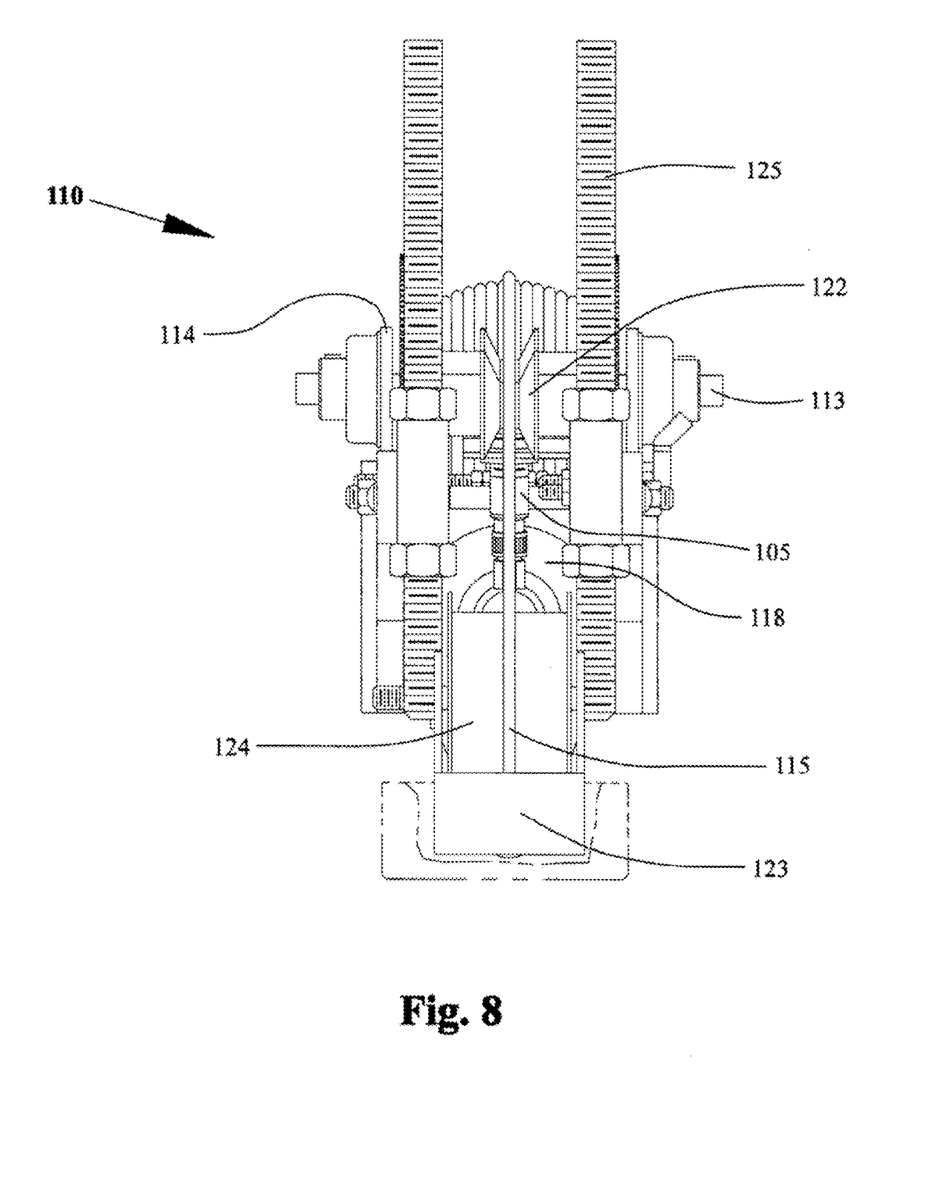
FIG. 8 depicts an elevation view of the destination end of the invention of FIG. 1.
Figure 9:
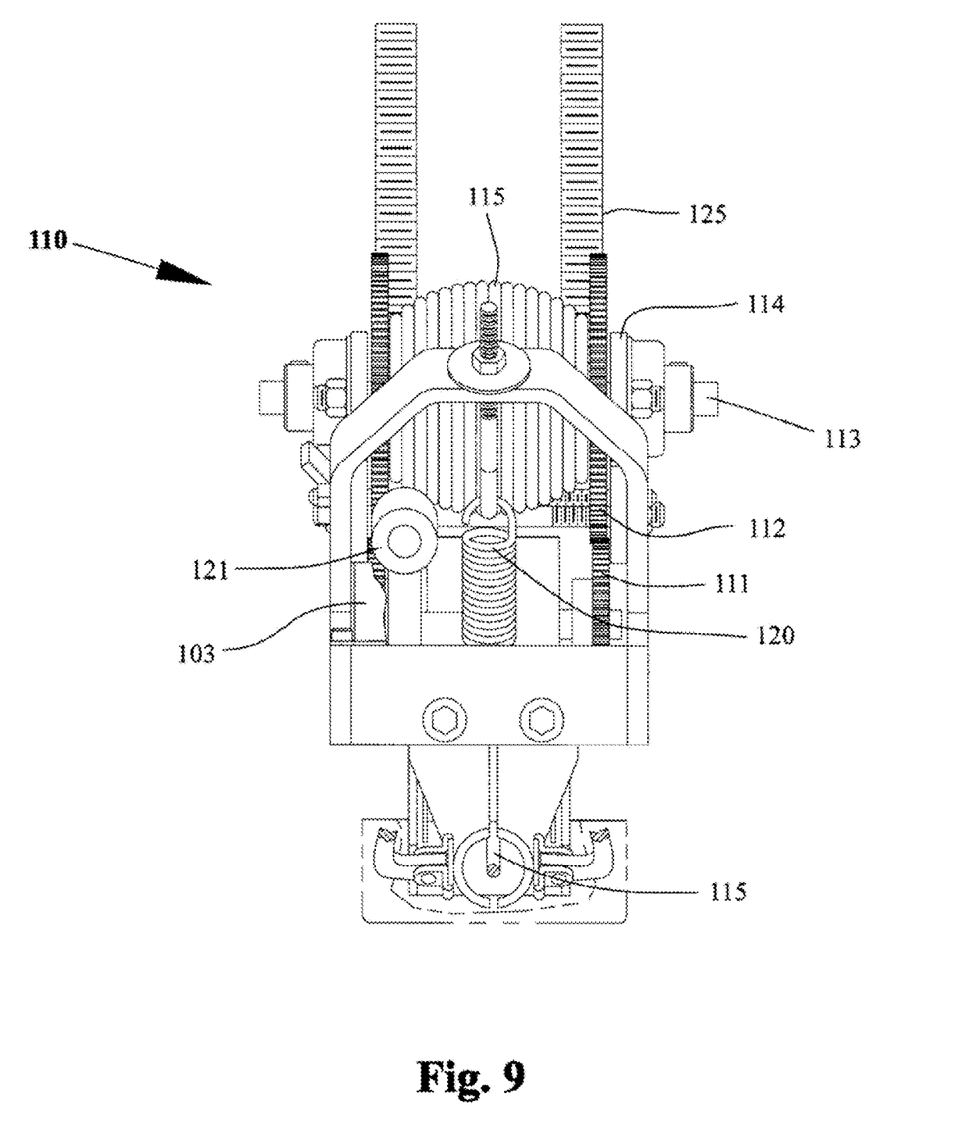
FIG. 9 depicts an elevation view from the beginning end of the invention of FIG. 1.
Figure 10:
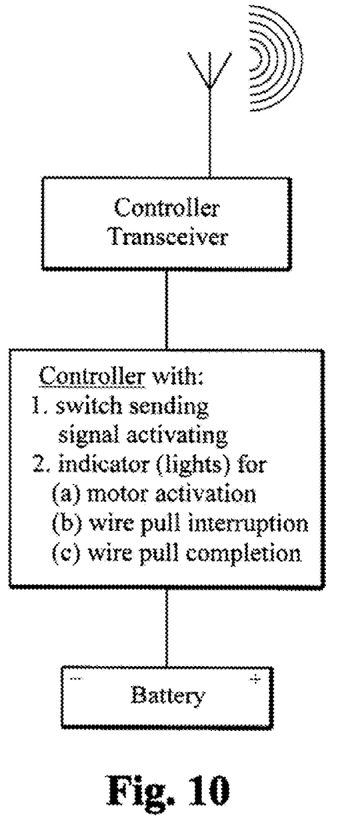
FIG. 10 depicts a schematic diagram of the primary wireless components of a controller.
Figure 11:
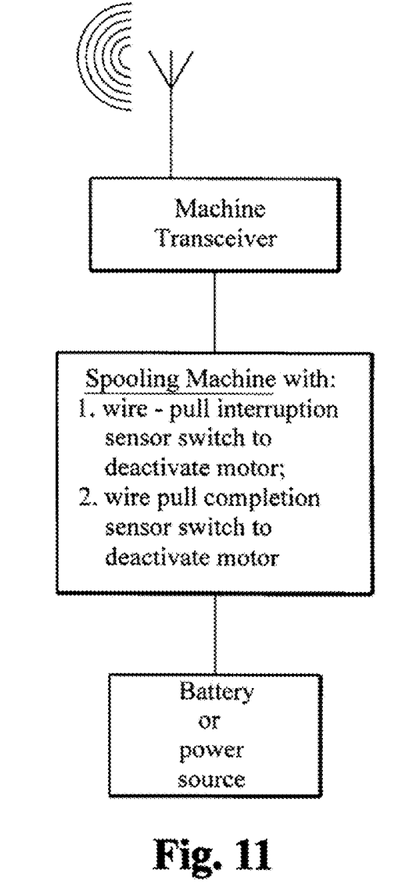
FIG. 11 depicts a schematic diagram of the primary wireless components of a spooling machine.
Figure 12:
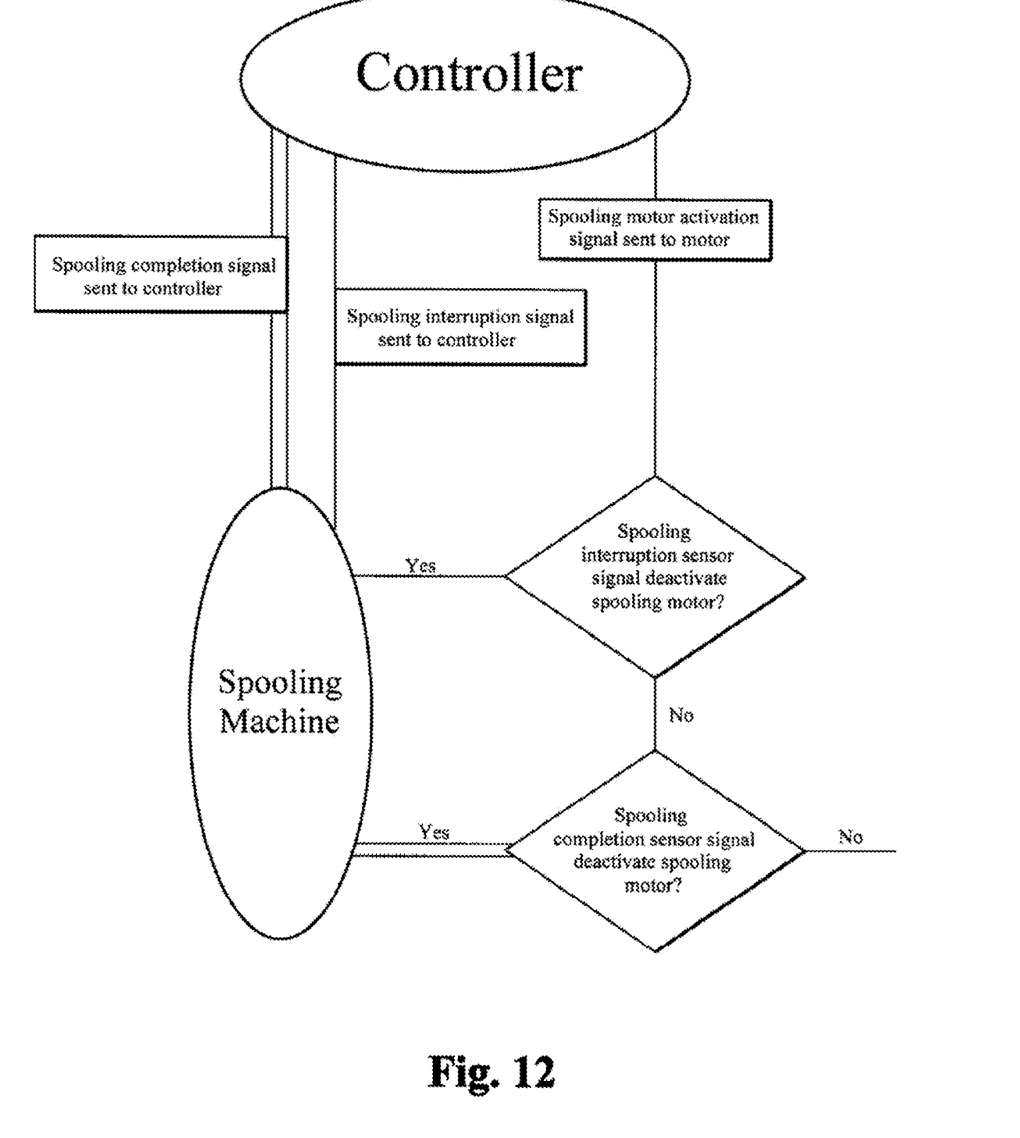
FIG. 12 depicts the primary wireless operational steps of the invention.
Figure 13:
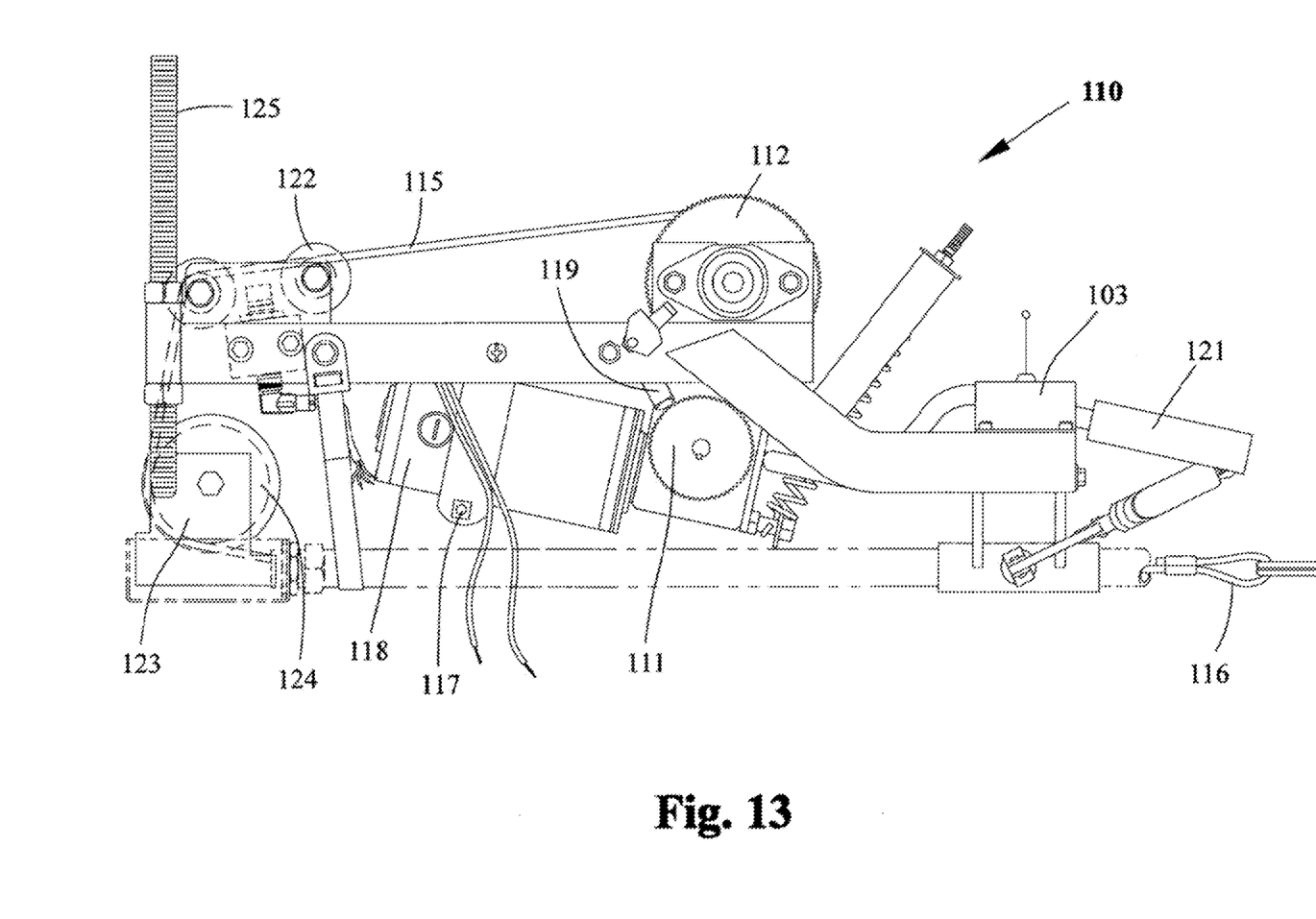
FIG. 13 depicts an elevation view of the left side of the invention, with the motor-driven gear-wheel disengaged from the cogged spool-wheel.

One preferred embodiment includes a wireless spooling controller in cooperating communication with a spooling machine having an anchoring means for anchoring said spooling machine near the destination end of the conduit;
(a) said spooling machine (110) comprising:
(1) a motor-driven gear-wheel (111) engageable with a cogged spool-wheel (112) impaled on an axis (113) on a portion of the anchoring means frame (114);
(2) a pull-line (115) having one end attached to said spool-wheel, and a free end (116) threadable through the conduit and joinable to the end of the wire to be pulled into the mouth of the conduit and out of the destination end of the conduit;
(3) motor disengagement means comprising hinge mounting (117), to said anchoring means, a hinged-end (118) of said motor-drive distal from said gear-wheel;
(4) said anchoring means comprising a ratcheting strap system (not shown), or a clamp (not shown) having a cooperating pair of concave shoes adjustable for clamping a conduit and thereby anchoring said spooling machine near the destination end of the conduit;
(5) a chock (119) pivot-mounted at a mounted end to said anchoring means, said chock engageable with said gear-wheel, the pivotal movement of said chock to said gear-wheel facilitating the fulcrumatic disengagement of said gear-wheel from said spool-wheel cogs;
(6) an extension spring (120) having one end affixed to said motor-drive proximal to said gear-wheel and another end affixed to the anchoring means frame, spring biasing said gear-wheel into engagement with said spool-wheel cogs;
(7) a lever handle (121) facilitating unbiasing of said gear-wheel and chocking of said gear-wheel out of engagement with said spool-wheel cogs, activation of said motor-drive activating rotation of said gear-wheel and un-chocked engagement of said gear-wheel and said spool-wheel cogs;
(8) a centering roller (122) for centering the pull-line between the destination end of the conduit and the spool-wheel;
(9) an idler bracket (123) facilitating stable positioning of said centering roller near a conduit box at the destination end of the conduit, and carrying an idler roller (124) facilitating travel of the pull-line between the destination end of the conduit and said spool-wheel;
(10) a wire-pull completion sensor (105) means for sensing when the free end of the wire has been pulled completely out of the destination end of the conduit; and
(11) a spooling RF transceiver (103) for receiving signaling activating or deactivating said motor-drive, and for transmitting wire-pull completion signaling deactivating said motor-drive;
(b) said wireless spooling controller (100) comprising:
(1) a controller RF transceiver (101) for transmitting said signaling activating or deactivating the motor-drive, and for receiving said wire-pull completion signaling; and
(2) indicator means (102) for indicating said receipt of said signaling activating or deactivating said motor-drive, and for indicating said receipt of said wire-pull completion signaling.

Besides the machine disclosed herein, the invention also includes a method of using the machine to pull wire through conduit. Before attachment of the wire to the spooling machine is necessary, a string or fish tape is threaded through the entire length of the conduit, ready to have its free end tied to the pull-line. After attaching the free end of the pull-line to the string or fish tape, the user pulls the other end of the string or fish tape so that the attached end of the pull-line is pulled into the conduit and threaded the length of the conduit. If the pull-line is spooled on the cogged spool-wheel of the spooling machine, it is advantageous to have the motor-driven gear-wheel chocked out of engagement with the cogged spool-wheel when the user pulls the string to initially pull the pull-line into the conduit for extension the length of the conduit.

The spooling machine is clamped (or strapped) to conduit near the destination end, with the idler bracket inside the conduit box and adjusted to allow the pull-line to pass smoothly from inside the conduit, over the idler roller and over a centering roller. The motor-driven gear-wheel is chocked out of engagement with the cogged spool-wheel, using the lever to overcome the spring-biasing towards unchocked engagement of the gear-wheel and the spool-wheel. Chocking (or other disengagement) will allow the spool-wheel to rotate freely, so that the string or fish tape may pull the pull-line through the conduit to thereby extend the pull-line the entire length of the conduit. After the wire is attached to the pull-line, the user activates the motor using the RF transmitter on the controller; motorized turning of the gear-wheel essentially overcomes the chock, and causes unchecked engagement of the gear-wheel and the cogged spool-wheel.

In general, the method of using the wireless-controlled wire pulling machine includes the steps of:

(a) chocking the gear-wheel out of engagement with the spool-wheel cogs;

(b) threading the free end of the pull-line through the conduit and attaching it to a free end of the wire near the mouth of the conduit; and (c) activating the wireless spooling controller RF transceiver signaling to activate the motor-drive.

The aforementioned method of using the machine may include the further steps of, upon receipt of a wire-pull interruption indicator signaling at the mouth of the conduit, pulling the wire partly back out of the mouth of the conduit, then re-activating the wireless spooling controller RF transceiver signaling to re-activate the motor-drive. If the spooling machine is bi-directional and includes the switch(es) necessary for reversing the spooling, the user may reverse the spooling sufficient to relieve any tension on the pull-line or wire caused by snagging of same in the conduit, then pull the wire back toward the mouth of the conduit before reactivating the spooling. In any event, the spooling machine will deactivate upon completion of wire pulling, and signal such completion to the user at the controller.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

I claim:

1. An apparatus for pulling a free end of wire into the mouth of a conduit and out the destination end of the conduit, said apparatus comprising a wireless spooling controller in cooperating communication with a spooling machine having an anchoring means for anchoring said machine near the destination end of the conduit, said machine comprising a frame including a first and second end, a motor-driven gear-wheel engageable with a cogged spool-wheel impaled on an axis with at least one roller on said second end of said frame and an element having a guide member, said controller selected from the group consisting of transmitters of RF signals, optical links, ultrasonic links, and sonar, in cooperating communication with a machine wireless receiver cooperatively compatible with said selected controller transmitter.

2. The apparatus described in claim 1, said controller comprising a controller RF transmitter for signaling activating and deactivating said machine, said machine further comprising a pull-line having one end attached to said spool-wheel, and a machine RF receiver for receiving said signaling activating or deactivating said machine.

3. The apparatus described in claim 2, said machine further comprising a disengagement means for disengaging said gear-wheel from said cogged spool-wheel.

4. The apparatus described in claim 3, said disengagement means comprising hinge mounting, to said anchoring means, a hinged-end of said motor-drive distal from said gear-wheel, said machine further comprising a chock pivot-mounted at a mounted end to said anchoring means, said chock engageable with said gear-wheel, the pivotal movement of said chock to said gear-wheel facilitating the fulcrumatic disengagement of said gear-wheel from said spool-wheel cogs.

5. The apparatus described in claim 4, said machine further comprising an extension spring having one end affixed to said motor-drive proximal to said gear-wheel, and another end affixed to said anchoring means and spring biasing said gear-wheel into engagement with said spool-wheel cogs.

6. The apparatus described in claim 5, said machine further comprising a lever handle facilitating unbiasing of said gear-wheel and chocking of said gear-wheel out of engagement with said spool-wheel cogs.

7. The apparatus described in claim 4, said signaling activating said motor-drive activating rotation of said gear-wheel, un-chocking of said gear-wheel, and engagement of said gear-wheel and said spool-wheel cogs.

8. The apparatus described in claim 7, said pull-line having a free end threadable through the conduit and joinable to the end of the wire to be pulled into the mouth of the conduit and out of the destination end of the conduit.

9. The apparatus described in claim 8, said anchoring means further comprising a centering roller for centering the pull-line between the destination end of the conduit and the spool-wheel.

10. The apparatus described in claim 9, said anchoring means further comprising an idler bracket facilitating stable positioning of said centering roller near a conduit box at the destination end of the conduit, and carrying an idler roller facilitating travel of the pull-line between the destination end of the conduit and the spool-wheel.

11. The apparatus described in claim 10, said anchoring means further comprising an adjustment means for adjusting the positioning of said machine near the destination end of the conduit.

12. The apparatus described in claim 11, said machine further comprising a wire-pull completion sensor switch means for deactivating said motor drive when the free end of the wire has been pulled completely out of the destination end of the conduit, and a machine RF transmitter transmitting wire-pull completion signaling, said wireless spooling controller further comprising a controller RF receiver for receiving said wire-pull completion signaling, and indicator means for indicating said receipt of said wire-pull completion signaling.

13. The apparatus described in claim 12, said completion sensor switch means comprising a proximity sensor switch near the destination end of the conduit and sensing the proximity of wire to deactivate said motor-drive.

14. The apparatus described in claim 13, said completion sensor switch means comprising a limit sensor switch near the destination end of the conduit and through which the pull-line travels, sensing the increase in diameter as the wire is pulled through said limit sensor to deactivate said motor-drive.

15. The apparatus described in claim 14, said machine further comprising a wire-pull interruption sensor switch means for deactivating said motor-drive when said free end of said pull-line has become snagged within the conduit, said machine RF transmitter transmitting wire-pull interruption signaling, said controller RF receiver receiving said wire-pull interruption signaling, said indicator means indicating said receipt of said wire-pull interruption signaling.

16. The apparatus described in claim 15, said interruption sensor switch means comprising a thermal overload sensor switch sensing resistance to spooling by said motor-drive.

17. The apparatus described in claim 16, said anchoring means further comprising a clamp having a cooperating pair of concave shoes adjustable for clamping a conduit and thereby anchoring said apparatus near the destination end of the conduit.

18. An apparatus for pulling a free end of wire into the mouth of a conduit and out of the destination end of the conduit, said apparatus comprising a wireless spooling controller in cooperating communication with a spooling machine having an anchoring means for anchoring said spooling machine near the destination end of the conduit;

(a) said spooling machine comprising:
  (1) a motor-driven gear-wheel engageable with a cogged spool-wheel impaled on an axis on said anchoring means comprising a clamp having a cooperating pair of concave shoes adjustable for clamping a conduit and thereby anchoring said spooling machine near the destination end of the conduit;
  (2) a pull-line having one end attached to said spool-wheel, and a free end threadable through the conduit and joinable to the end of the wire to be pulled into the mouth of the conduit and out of the destination end of the conduit;
  (3) motor disengagement means comprising hinge mounting, to said anchoring means, a hinged-end of said motor-drive distal from said gear-wheel, and a chock pivot-mounted at a mounted end to said anchoring means, said chock engageable with said gear-wheel, the pivotal movement of said chock to said gear-wheel facilitating the fulcrumatic disengagement of said gear-wheel from said spool-wheel cogs;
  (4) an extension spring having one end affixed to said motor-drive proximal to said gear-wheel and another end affixed to said anchoring means, spring biasing said gear-wheel into engagement with said spool-wheel cogs, and a lever handle facilitating unbiasing of said gear-wheel and chocking of said gear-wheel out of engagement with said spool-wheel cogs, activation of said motor-drive activating rotation of said gear-wheel and un-chocked engagement of said gear-wheel and said spool-wheel cogs;
  (5) a centering roller for centering the pull-line between the destination end of the conduit and the spool-wheel, and an idler bracket facilitating stable positioning of said centering roller near a conduit box at the destination end of the conduit, and carrying an idler roller facilitating travel of the pull-line between the destination end of the conduit and said spool-wheel;
  (6) a wire-pull completion sensor means for sensing when the free end of the wire has been pulled completely out of the destination end of the conduit; and
  (7) a machine RF transceiver for receiving signaling activating or deactivating said motor-drive, and for transmitting wire-pull completion signaling deactivating said motor-drive;

(b) said wireless spooling controller comprising:
  (1) a controller RF transceiver for transmitting said signaling activating and deactivating the motor-drive, and for receiving said wire-pull completion signaling; and
  (2) indicator means for indicating said receipt of said signaling activating or deactivating said motor-drive, and for indicating said receipt of said wire-pull completion signaling.

* * * * *